(12) United States Patent
Bosken

(10) Patent No.: US 10,116,794 B2
(45) Date of Patent: Oct. 30, 2018

(54) DETERMINING AN ACTIVE STATION BASED ON MOVEMENT DATA

(71) Applicant: Interactive Intelligence Group, Inc., Indianapolis, IN (US)

(72) Inventor: Christopher W Bosken, Cary, NC (US)

(*) Notice: Subject to any disclaimer, the term of this patent is extended or adjusted under 35 U.S.C. 154(b) by 0 days.

(21) Appl. No.: 14/710,612

(22) Filed: May 13, 2015

(65) Prior Publication Data

US 2016/0337518 A1    Nov. 17, 2016

(51) Int. Cl.
*H04M 3/00* (2006.01)
*H04M 3/51* (2006.01)
*H04W 4/02* (2018.01)

(52) U.S. Cl.
CPC ....... *H04M 3/5175* (2013.01); *H04M 3/5125* (2013.01); *H04W 4/027* (2013.01)

(58) Field of Classification Search
CPC ........ G06F 3/017; H04M 3/5175; H04M 1/00
USPC ....... 379/265.01–265.14, 266.01–266.1, 309
See application file for complete search history.

(56) References Cited

U.S. PATENT DOCUMENTS

| | | | | |
|---|---|---|---|---|
| 5,822,418 A * | 10/1998 | Yacenda | ............. | G08B 3/1083 379/198 |
| 5,991,645 A * | 11/1999 | Yuen | .................. | H04M 1/6033 455/575.2 |
| 6,330,325 B1 * | 12/2001 | Reid | ....................... | H04M 3/51 379/214.01 |
| 6,625,139 B2 * | 9/2003 | Miloslavsky | ........ | G06Q 10/107 348/E7.082 |
| 7,356,139 B2 * | 4/2008 | Turcan | ................ | H04M 3/5183 379/265.01 |
| 7,493,214 B2 * | 2/2009 | Jung | ................ | G08G 1/096816 340/995.19 |
| 7,620,170 B2 * | 11/2009 | Turcan | .............. | H04M 3/42323 379/265.02 |
| 7,983,661 B2 * | 7/2011 | Purontaus | ............. | H04M 3/436 379/265.09 |
| 8,229,458 B2 * | 7/2012 | Busch | ..................... | H04W 4/02 370/338 |
| 8,767,943 B2 * | 7/2014 | Turcan | .............. | H04M 3/42323 379/265.01 |
| 8,886,156 B2 * | 11/2014 | Khouri | ............... | H04M 3/5235 340/426.19 |
| 9,163,946 B2 * | 10/2015 | Chowdhary | ......... | G01C 21/165 |
| 2003/0035532 A1 * | 2/2003 | Ganesan | ............. | H04M 3/5125 379/265.04 |
| 2003/0083066 A1 * | 5/2003 | Shin | ................... | H04W 36/0011 455/433 |
| 2007/0082668 A1 * | 4/2007 | Silver | ..................... | H04W 4/02 455/432.3 |
| 2009/0312038 A1 * | 12/2009 | Gildea | ................... | G01S 19/52 455/456.4 |
| 2011/0034152 A1 * | 2/2011 | Khouri | ................ | H04M 3/5235 455/413 |
| 2011/0053577 A1 * | 3/2011 | Lee | ................... | H04M 1/72552 455/418 |

(Continued)

*Primary Examiner* — William Deane, Jr.

(57) ABSTRACT

Methods for determining an active station based on sensor data are provided. In one example, a method includes the steps of receiving movement data and determining a pattern of movement associated with a contact center station based at least in part on the movement data. An active contact center station is updated based on the pattern of movement.

10 Claims, 4 Drawing Sheets

(56) References Cited

U.S. PATENT DOCUMENTS

| | | | | |
|---|---|---|---|---|
| 2012/0303271 A1* | 11/2012 | Chowdhary | A61B 5/0022 | 701/433 |
| 2013/0117109 A1* | 5/2013 | Busch | H04W 4/02 | 705/14.53 |
| 2013/0305324 A1* | 11/2013 | Alford, Jr. | G06F 21/31 | 726/5 |
| 2014/0028539 A1* | 1/2014 | Newham | G06F 1/1694 | 345/156 |
| 2014/0142885 A1* | 5/2014 | Chowdhary | G01C 21/12 | 702/141 |
| 2014/0330505 A1* | 11/2014 | Wenneman | G01C 21/3484 | 701/117 |
| 2015/0032424 A1* | 1/2015 | Gupta | G01C 21/00 | 703/2 |
| 2015/0215753 A1* | 7/2015 | Leipzig | H04W 8/22 | 455/419 |
| 2016/0018900 A1* | 1/2016 | Tu | G06F 1/3234 | 345/156 |
| 2016/0043924 A1* | 2/2016 | Cejnar | G06F 11/3006 | 709/224 |
| 2016/0050308 A1* | 2/2016 | Liu | H04W 52/0209 | 455/411 |
| 2016/0055323 A1* | 2/2016 | Stuntebeck | G01P 13/00 | 726/17 |
| 2016/0066189 A1* | 3/2016 | Mahaffey | G06F 21/316 | 455/405 |
| 2016/0097646 A1* | 4/2016 | Alonso | G06Q 30/02 | 701/408 |
| 2016/0127557 A1* | 5/2016 | McCormack | H04M 3/5233 | 379/265.12 |
| 2016/0279501 A1* | 9/2016 | Jang | A63B 71/0619 | |
| 2016/0337794 A1* | 11/2016 | Kim | H04W 4/023 | |

* cited by examiner

DETERMINING AN ACTIVE STATION BASED ON MOVEMENT DATA

FIELD

This invention relates generally to contact centers, and more specifically to determining an active station based on movement data.

BACKGROUND

In some conventional contact centers, a contact center agent may only use a single contact center station for interacting with callers. However, in some other contact centers, a contact center agent may utilize multiple contact center stations. A contact center agent may be required to manually update their active station each time they switch stations or even log in to the contact center system.

If an agent forgets to manually update their active contact center station than one or more calls may be routed to the wrong contact center station. In the worst case, the contact center agent may be unaware as they miss multiple calls until finally returning to their former contact center station, which remained their active contact center station the whole time.

Thus there is a need for new methods to update an active station.

SUMMARY

Embodiments of the invention determine an active station based on movement data. An exemplary method may comprise the steps of receiving movement data, determining a pattern of movement associated with a contact center station based on the movement data, and updating an active contact center station based on the pattern of movement.

In another aspect, a method comprises the steps of connecting to a contact center system, receiving accelerometer data, determining a pattern of movement associated with a contact center station based at least in part on the accelerometer data, and updating an active contact center station based on the pattern of movement.

Further embodiments, features, and advantages of the invention, as well as the structure and operation of the various embodiments of the invention are described in detail below with reference to the accompanying drawings.

BRIEF DESCRIPTION OF THE DRAWINGS

The accompanying drawings, which are incorporated herein and form a part of the specification, illustrate the present invention and, together with the description, serve to explain the principles of the invention and to enable a person skilled in the pertinent art to make and use the invention.

DETAILED DESCRIPTION

Figure 1:
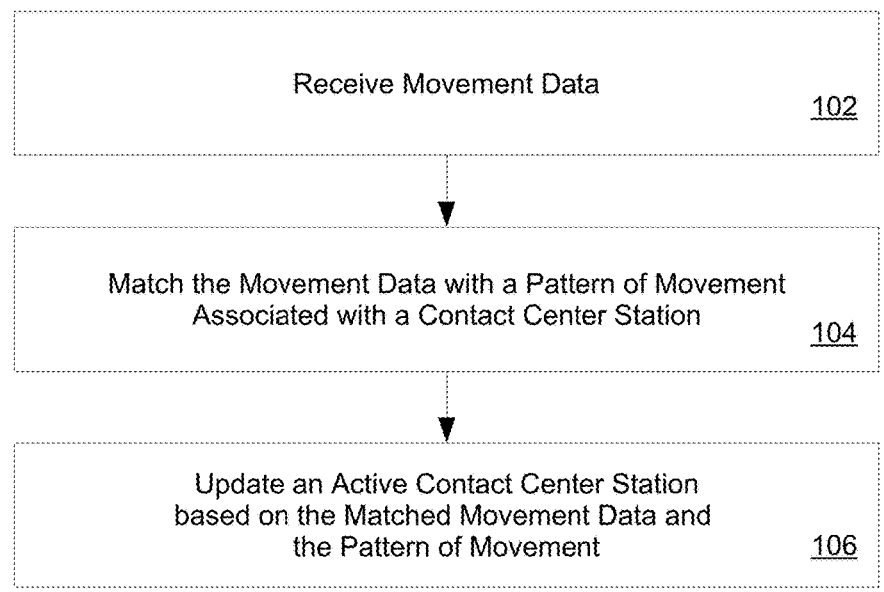
FIG. 1 is a flow chart illustrating a method according to an embodiment.

Embodiments are described for determining an active station based on sensor data. By matching movement data with a movement pattern correlated to a contact center station, an active contact center station may be timely and accurately updated, ensuring efficient operation of a contact center system.

In one exemplary embodiment a business operates a contact center system for managing phone calls and routing the calls to contact center agents. A contact center agent may address phone calls and interact with callers by accessing the contact center system through a contact center client executing on one or more contact center stations, such as a workstation, personal computer, laptop, tablet, or smartphone. An agent may use different stations for accessing the contact center system at different times. In the example, an agent accesses the contact center system through an office workstation during normal business hours, and accesses the contact center system through a tablet at other times. The contact center station presently being used by an agent may be considered the active contact center station for that user. Contact center stations not presently used by an agent may be considered inactive contact center stations.

At the beginning of a day, a contact center agent may access a contact center client on a personal computer from their home. The personal computer may be set as the initial active contact center station based on one or more factors, such as the last active contact center station, or the time of day the contact center system is accessed, for example, outside of normal business hours. During a typical day an agent may travel between different locations, such as commuting from home to work, and change active contact center stations. As an agent moves between locations, a mobile device associated with the agent, such as a smartphone or connected wearable device, may collect movement data.

In the example, an agent moves from their home to a contact center office. At the contact center office, the agent accesses the contact center system through a contact center client on a contact center workstation. Meanwhile, the contact center system may receive movement data from the mobile device associated with the agent. The contact center system may match the movement data with a pattern of movement associated with the contact center station at the office. Based on the matching pattern, the contact center system may automatically update an active contact center station associated with the agent to the office workstation. By automatically determining the active contact center station for an agent, an agent may avoid losing calls by failing to update their active contact center station to the contact center station they are presently using.

Illustrated Methods

Selected methods are illustrated and described for determining an active station based on sensor data. A contact center agent may access a contact center system through a plurality of contact center stations. However at any given time, an agent may only utilize a single contact center station, their active contact center station, for interacting with callers. By determining an active contact station based on sensor data, an agent may not have to manually update their own active contact center station, and avoid missing any calls from an incorrect active station assignment.

FIG. 1 is a flow chart illustrating a method according to an embodiment. As shown in FIG. 1, in step 102 of method 100, movement data may be received. In one embodiment, movement data may be received from a movement sensor, such as an accelerometer. A mobile device, such as a smartphone, tablet, or wearable device, may comprise a movement sensor. While a mobile device user moves between stations, the mobile device may collect movement data and transfer the movement data over a network to be received by a contact center system.

Movement data may be generated by a sensor. In one embodiment, a sensor generating movement data comprises an accelerometer. An accelerometer may comprise an electromechanical device capable of measuring acceleration forces. An accelerometer may measure static acceleration forces, such as gravity, or dynamic acceleration forces, caused by moving the accelerometer. By measuring the amount of static acceleration due to gravity, the angle the accelerometer is tilted at with respect to the earth may be determined. By measuring the amount of dynamic acceleration, the way the device is moving may be determined.

Figure 5:
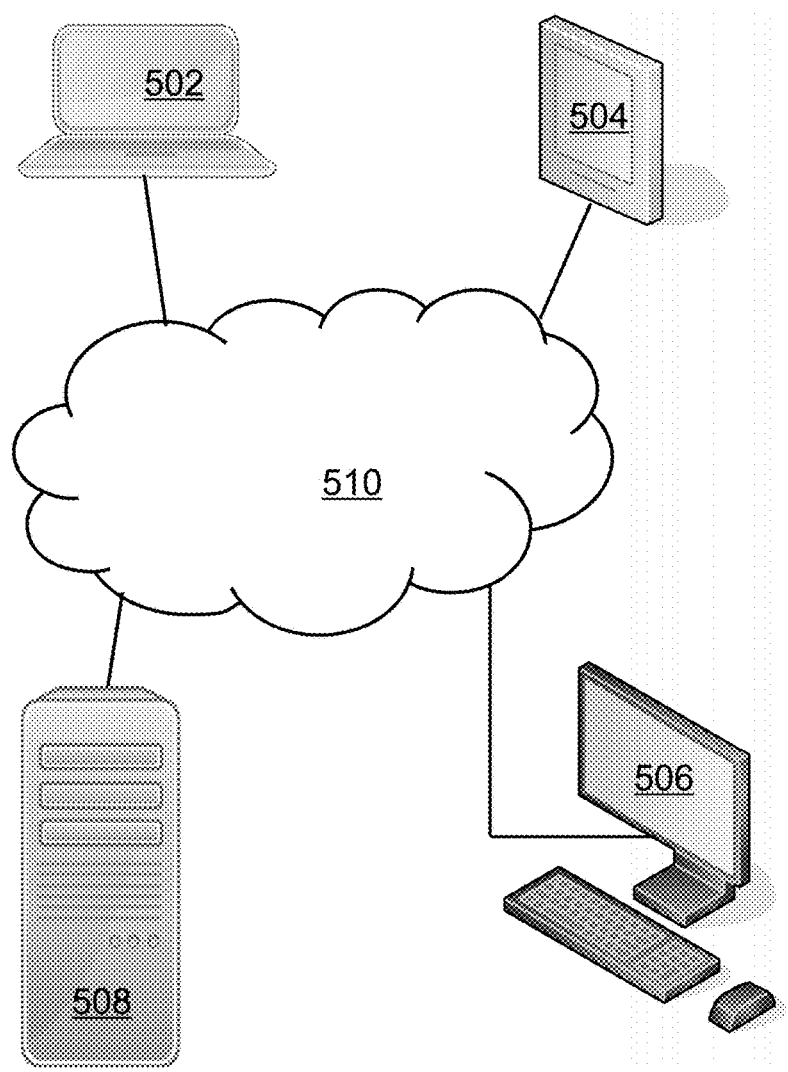
FIG. 5 is a diagram illustrating a system according to an embodiment.

Movement data may be transmitted over a network and received by a server, such as server 508, as illustrated in FIG. 5 and discussed below. In step 104 of method 100, the movement data may be matched with a pattern of movement associated with a contact center station. Server 508 may match the movement data with a pattern of movement.

Movement data may be generated when a device, such as a smartphone, tablet, or wearable device, is moved from one location to another. Movement data may be collected by a contact center system. In one embodiment, the device generating movement data may comprise a contact center station, such as a smartphone. In another embodiment, the device generating movement data may not comprise a contact center station.

In step 106 of method 100, an active contact center station may be updated based on the movement data and matched pattern of movement. In one embodiment, a contact center agent may utilize a plurality of different contact center stations for interacting with callers throughout a work week. As the agent moves from one contact center station to another, movement data may be automatically collected, and compared against one or more patterns of movement associated with one or more contact center stations. When movement data matches a pattern of movement associated with a contact center station, the active contact center station may be updated based on the matched movement data and the pattern of movement. The former active contact center station may be labeled as an inactive contact center station.

Figure 2:
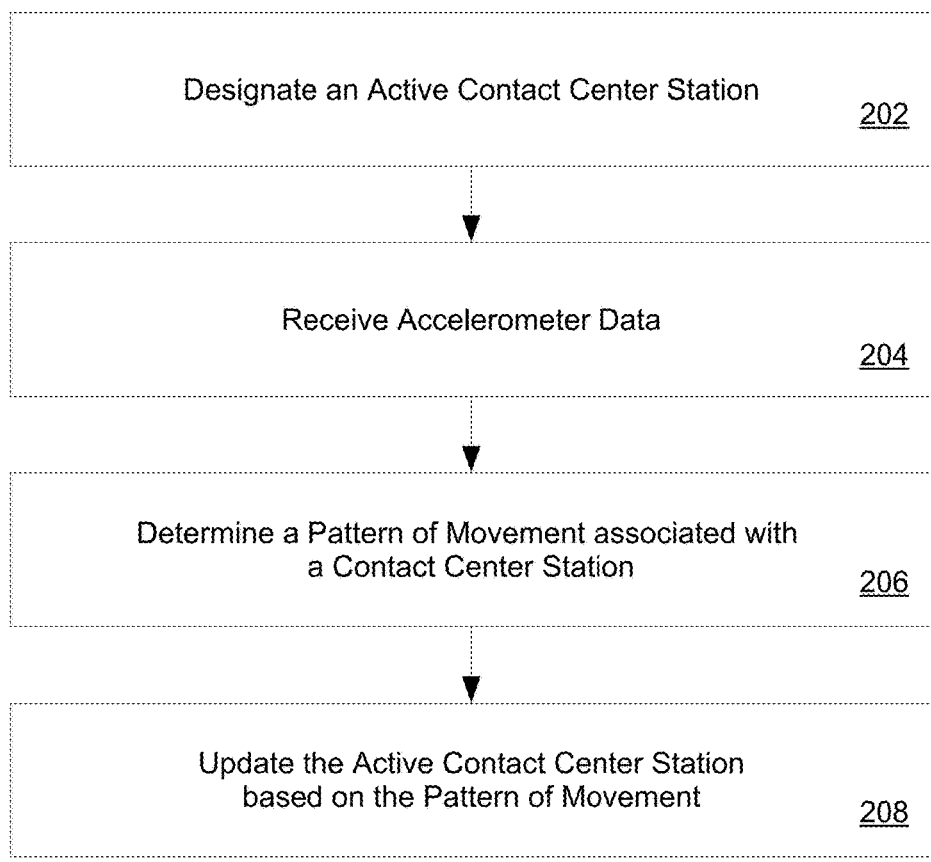
FIG. 2 is a flow chart illustrating a method according to another embodiment.

FIG. 2 is a flow chart illustrating a method according to another embodiment. As illustrated in FIG. 2, in step 202 of method 200, an active contact center station may be designated. An active contact center station may be designated based on manual input. For example, an agent may manually specify their current contact center station as their active contact center station.

In another embodiment, an active contact center station may be automatically designated. For example, an agent may set a rule such that their active contact center station is set to a first contact center station during business hours, and their active contact center station is set to a second contact center station outside of business hours. As another example, a contact center station actively being used by an agent may automatically set itself as the active contact center station, without manual designation by the agent.

In step 204, accelerometer data may be received. Accelerometer data may be generated by an accelerometer as the accelerometer measures movement of a device. Accelerometer data may be associated with the movement of a contact center agent from one location to another location.

In step 206, a pattern of movement associated with a contact center station may be determined. The pattern of movement may be determined based on the accelerometer data. In step 208, an active contact center station may be updated based on the pattern of movement.

In one embodiment, an active contact center station is set as a mobile device, such as a smartphone. A contact center agent may access a contact center system from virtually any location with an adequate network connection to the contact center system. The contact center agent may utilize the mobile device while both working at her home and working at an office. In such an embodiment, accelerometer data may be collected as an agent moves from her home to her office, however the active contact center station may never be updated, since the active contact center station may remain the mobile device.

Figure 3:
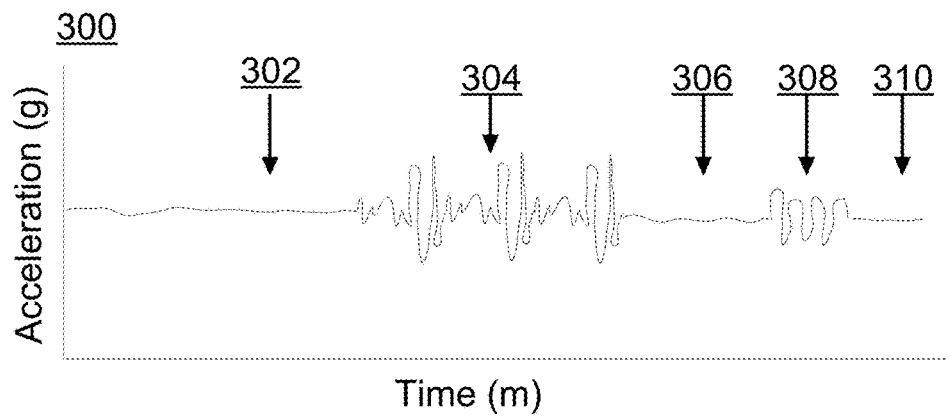
FIGS. 3-4 are illustrations of movement data according to embodiments.
Figure 4:
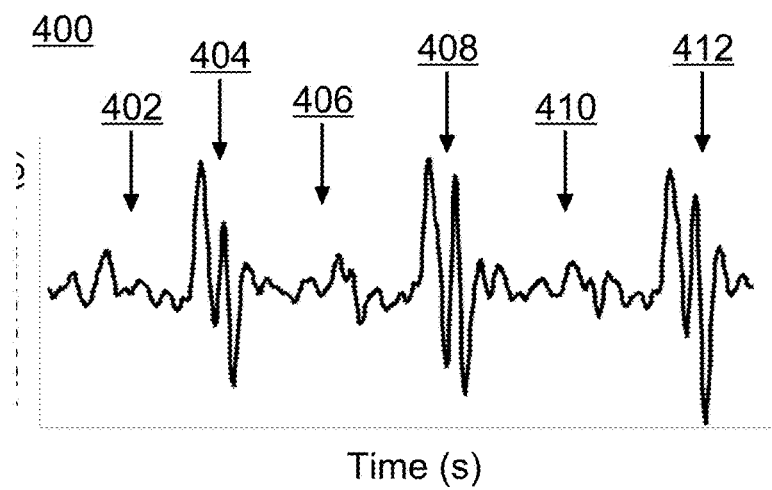

FIGS. 3-4 illustrate movement data according to embodiments. As show in FIGS. 3-4, movement data may be illustrated by a plot of acceleration (illustrated in g-force) versus time (illustrated in minutes or seconds). Movement data may be collected by a movement sensor such as an accelerometer. Movement data may be matched with a pattern of movement associated with a contact center station.

In one embodiment, an accelerometer may comprise a damped mass positioned on the end of a spring and a measurement of how far the damped mass has moved on the spring in a particular direction. In embodiments an accelerometer may comprise a single-axis accelerometer or a three-axis accelerometer.

FIG. 3 comprises movement data plot 300. As shown in FIG. 3, movement data plot 300 may illustrate movement data coinciding with five sections of movement data 302, 304, 306, 308, and 310. Initially, a flat or nearly flat plot such as first section 302 may indicate that the device is being held relatively still. In some embodiments, a flat plot of movement data generated by a single-axis accelerometer may correspond to an unchanging vertical position of the accelerometer. A period of steady acceleration force may correspond to holding a mobile device with an accelerometer steady, such as riding in a car or standing still.

Unlike first section 302, second section 304 may indicate regular, semi-regular movement of the device. Movement data associated with regular or semi-regular movement may be correlated to certain activities, such as walking across a flat area, walking upstairs, or walking downstairs.

Third section 306 and fifth section 310 may indicate little or no movement of the device, similar to first period of movement 302. During such periods, an agent may have sat or stood in one place, such as for driving a car or waiting on an elevator.

Fourth section 308 may indicate another period where the device was moved. However, the differences between the acceleration forces measured during fourth section 308 and second section 304 may indicate different types of movement, for instance walking rather than running, or walking across a floor rather than walking up a flight of stairs.

Taken together, five sections of movement data 302, 304, 306, 308, 310 may be matched with a regular pattern of movement, such as an agent driving to work, walking across a parking lot, waiting on an elevator, and walking into an office. This pattern of movement may be associated with a particular contact center station, such as workstation 506, as illustrated in FIG. 5 and discussed below. If the movement data is matched with a pattern of movement associated with the workstation, than the active contact center station may be updated based on the movement data and pattern of movement.

FIG. 4 comprises movement data plot 400. As shown in FIG. 4, movement data plot 400 may illustrate movement data coinciding with six periods of movement 402, 404, 406, 408, 410, and 412. The repeating patterns illustrated in section 402, 404, 406, 408, 410, and 412 may indicate regular movement, such as walking or climbing a flight of stairs. By collecting enough movement data, the movement data may be eventually matched with a pattern of movement associated with a contact center station, and an active contact center station may be updated based on the movement data and matched pattern of movement.

Illustrated System

Organizations such as businesses may operate a contact center system to handle incoming communications from one or more callers. A caller may comprise an external party, such as a customer. A caller may attempt to communicate with an organization through a call, such as a voice call, (sometimes referred to as a phone call), video call (sometimes referred to as a video chat), instant message chat, or through some other type of interaction.

A contact center system may comprise a distribution center for routing incoming communications to one or more contact center stations. An interaction may begin when a contact center agent begins interacting with an external party, for example by receiving and transmitting video for a video chat, or receiving and transmitting audio for an audio chat.

A contact center agent, such as a member of the organization operating the contact center system, may interact with callers through contact center software executing on a contact center station. A contact center agent may engage in one or more interactions at the same time, for example, by instant message chatting with one caller while simultaneously talking with another caller. In a small business or organization, agents are often required to multi-task due to limited resources, and may even carry on other non-contact center related tasks while interacting with callers.

A contact center station in the form of a mobile device may comprise a smartphone, e-reader, phablet, or a tablet. In other embodiments, a contact center station may comprise other types of devices. A contact center station may be configured to collect movement data from a sensor such as an accelerometer. A contact center station may generate a graphical user interface, and execute an application such as contact center client software within the graphical user interface. Applications operating on contact center stations may comprise native mobile device applications such as an iOS iPad application, a Windows Phone application, or an Android application. As one alternative, an application operating on a contact center station may comprise a web application accessed through a web browser.

FIG. 5 is a diagram illustrating a system according to an embodiment. System 500 comprises contact center stations 502, 504, 506, server 508, and network 510. Contact center stations 502, 504, 506 and server 508 may be in communication over network 510. Network 510 may comprise the Internet, an intranet, or extranet, or some other type of electronic network.

A caller may communicate with a contact center agent by calling a contact center system operating on server 508. A caller may comprise an external party seeking to communicate with a contact center agent of the organization to solve an issue, such as making a purchase, fixing a bug, or making a payment. A caller may communicate with a contact center system on server 508 by generating a communication, or call, received by server 508. An incoming communication, or call, received by server 508 may comprise a phone call, video call, instant message chat, or some other type of call.

Server 508 may route incoming communications to one or more contact center stations, such as contact center stations 502, 504, 506. In one embodiment, an incoming communication may comprise an active or open and ongoing communication channel, such as a voice call, video chat, or instant message chat. In another embodiment, an incoming communication may comprise a passive communication channel, such as an email message or SMS text message.

A contact center station may comprise a network-enabled device configured to execute contact center software and communicate with server 508 over network 510. A contact center station may comprise a movement sensor such as an accelerometer. An accelerometer may be configured to detect movement of the contact center station. In one embodiment, contact center software executing on a contact center station may receive a triggering event and collect movement data based on the triggering event.

A contact center agent may interact with callers through contact center software executing on a contact center station, such as contact center stations 502, 504, 506. Examples of contact center stations comprise, without limitation, a personal computer, tablet, smartphone, or a workstation. As shown in FIG. 5, contact center station 502 comprises a personal computer 502, contact center station 504 comprises a smartphone, and contact center station 506 comprises a workstation.

In one embodiment, a contact center agent may use smartphone 504 to interact with callers and calls managed by a contact center system executing on server 508. Server 508 may execute contact center software for facilitating communication between callers and agents over a network, such as network 510.

Server 508 may receive information from a contact center station, such as movement data. In one embodiment, server 508 may receive accelerometer data from a contact center software executing on a contact center station such as smartphone 504. As another example, server 508 may receive location information, such as G.P.S. information, from personal computer 502.

Server 508 may match movement data with a pattern of movement associated with a contact center station and update an active contact center station based on the movement data and matched pattern of movement.

Scope

Embodiments of a subset or all and portions or all of the above may be implemented by program instructions stored in a memory medium or carrier medium and executed by a processor. A memory medium may be a transitory medium or non-transitory medium. A memory medium may include any of various types of memory devices or storage devices. The term "memory medium" is intended to include an installation medium such as a Compact Disc Read Only Memory (CD-ROM) floppy disks, tape device, a computer system memory or random access memory such as Dynamic Random Access Memory DRAM Double Data Rate Random Access Memory DDR RAM Static Random Access Memory SRAM Extended Data Out Random Access Memory EDO RAM Rambus Random Access Memory RAM etc. or a non-volatile memory such as a magnetic media e.g. a hard drive or optical storage. The memory medium may comprise other types of memory as well or combinations thereof. In addition the memory medium may be located in a first computer in which the programs are executed or may be located in a second different computer that connects to the first computer over a network such as the Internet. In some instances the second computer may provide program instructions to the first computer for execution. The term memory medium may include two or more memory mediums that may reside in different locations e.g. in different computers that are connected over a network.

In some embodiments a computer system at a respective participant location may include a memory medium on which one or more computer programs or software components according to one embodiment of the present invention may be stored For example the memory medium may store one or more programs that are executable to perform the methods described herein The memory medium may also store operating system software as well as other software for operation of the computer system.

Modifications and alternative embodiments of one or more aspects of the invention may be apparent to those skilled in the art in view of this description. Accordingly this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art rely after having the benefit of this description of the invention. Changes may be made in the elements described herein without departing from the spirit and scope of the invention as described above and below.

What is claimed is:

1. A method for determining an active contact center station for an agent in a contact center system, wherein the contact center system comprises a plurality of contact center stations, based on sensor data, the method comprising the steps of:
  receiving, by a processor of the contact center system, movement data from a mobile device associated with the agent;
  matching, by the processor of the contact center system, the movement data from the mobile device associated with the agent with a previously stored pattern of movement associated with one of the plurality of contact center stations associated with the agent; and
  automatically updating, by the processor of the contact center system, one of the plurality of contact center stations to active, wherein the update is based on the movement data and matched pattern of movement, and wherein the agent is not logged into the contact center system.

2. The method of claim 1, wherein the movement data comprises accelerometer data.

3. The method of claim 1, wherein the movement data is collected based on a triggering event which alerts the contact center system to begin collecting.

4. The method of claim 3, wherein the triggering event comprises a device wakeup, detection of a specific movement, time of day, or execution of contact center software.

5. The method of claim 1, further comprising:
  wherein matching the movement data comprises matching the movement data with the pattern of movement associated with one of the plurality of contact center stations.

6. The method of claim 1, wherein the pattern of movement associated with one of the plurality of contact center stations is based on the movement data and travel information collected about the agent within the contact center system.

7. The method of claim 6, wherein the travel information comprises information about at least one of departure location, departure time, arrival location, or arrival time.

8. The method of claim 1 further comprises determining, by the processor of the contact center system, a pattern of movement based on the movement data associated with one of the plurality of contact center stations associated with the agent.

9. A method for determining an active contact center station for an agent in a contact center system, wherein the contact center system comprises a plurality of contact center stations, based on sensor data, the method comprising the steps of:
  receiving, by a processor of the contact center system, a signal indicating an agent connection to the contact center system;
  receiving, by the processor of the contact center system, accelerometer data from a device associated with the agent;
  determining, by the processor of the contact center system, a pattern of movement associated with one of the plurality of contact center stations associated with the agent, wherein the determining is based at least in part on the accelerometer data; and
  automatically updating, by the processor of the contact center system, the contact center system, one of the plurality of contact center stations to active, wherein the update is based on the pattern of movement when the agent is not logged into the contact center system.

10. The method of claim 9 further comprises matching, by the processor of the contact center system, the accelerometer data associated with the agent with a previously stored pattern of movement associated with one of the plurality of contact center stations associated with the agent.

* * * * *